United States Patent
Duncan et al.

(10) Patent No.: US 10,802,379 B2
(45) Date of Patent: Oct. 13, 2020

(54) LOW PROFILE CAMERA HOUSING HAVING CONCAVELY CURVED BASE SURFACES AND RELATED SYSTEMS AND METHODS

(71) Applicant: MOHOC, Inc., Seattle, WA (US)

(72) Inventors: Connor J. Duncan, Bainbridge Island, WA (US); Daniel S. Fuhrman, Ketchum, ID (US); John M. Prosser, Mays Hill (AU)

(73) Assignee: MOHOC, Inc., Seattle, WA (US)

( * ) Notice: Subject to any disclaimer, the term of this patent is extended or adjusted under 35 U.S.C. 154(b) by 0 days.

(21) Appl. No.: 16/385,294

(22) Filed: Apr. 16, 2019

(65) Prior Publication Data

US 2020/0081322 A1     Mar. 12, 2020

Related U.S. Application Data

(63) Continuation of application No. 15/876,776, filed on Jan. 22, 2018, now abandoned, which is a continuation of application No. 14/716,312, filed on May 19, 2015, now abandoned.

(60) Provisional application No. 62/000,151, filed on May 19, 2014.

(51) Int. Cl.
| | |
|---|---|
| *G03B 17/02* | (2006.01) |
| *A42B 3/04* | (2006.01) |
| *G03B 29/00* | (2006.01) |
| *G02B 5/20* | (2006.01) |
| *G03B 7/26* | (2006.01) |
| *G03B 17/16* | (2006.01) |
| *G03B 17/56* | (2006.01) |
| *H04N 5/225* | (2006.01) |
| *G03B 11/00* | (2006.01) |
| *G03B 15/02* | (2006.01) |

(52) U.S. Cl.
CPC .......... *G03B 17/02* (2013.01); *A42B 3/0406* (2013.01); *G02B 5/208* (2013.01); *G03B 7/26* (2013.01); *G03B 17/16* (2013.01); *G03B 17/561* (2013.01); *G03B 17/563* (2013.01); *G03B 29/00* (2013.01); *H04N 5/2252* (2013.01); *H04N 5/2254* (2013.01); *A42B 3/042* (2013.01); *G03B 11/00* (2013.01); *G03B 15/02* (2013.01); *G03B 2217/007* (2013.01); *Y10T 29/49002* (2015.01)

(58) Field of Classification Search
CPC .......... G03B 17/02; G03B 7/26; G03B 17/16; G03B 17/561; G03B 17/563; G03B 29/00; G03B 11/00; G03B 15/02; G03B 2217/007; A42B 3/0406; A42B 3/042; G02B 5/208; H04N 5/2252; H04N 5/2254; Y10T 29/49002
See application file for complete search history.

(56) References Cited

U.S. PATENT DOCUMENTS

2009/0109286 A1*   4/2009   Ennis .................... A42B 3/042
                                                            348/81

* cited by examiner

*Primary Examiner* — Twyler L Haskins
*Assistant Examiner* — Fayez Bhuiyan
(74) *Attorney, Agent, or Firm* — King IP Law; Joshua King

(57) ABSTRACT

Low profile concavely curved cameras, camera housings and related systems and methods. These devices, etc., simultaneously reduce snags and other hazards and also provide improved protection to people such as military and first-responder personnel and athletes by improving the attachment of the camera housing to a helmet or other complexly curved convexly curved base substrate.

72 Claims, 7 Drawing Sheets

LOW PROFILE CAMERA HOUSING HAVING CONCAVELY CURVED BASE SURFACES AND RELATED SYSTEMS AND METHODS

CROSS-REFERENCE TO RELATED APPLICATIONS

The present application is a continuation of U.S. patent application Ser. No. 15/876,776 Jan. 22, 2018, which is a continuation of U.S. patent application Ser. No. 14/716,312, filed May 19, 2015, which claims the benefit of U.S. Provisional Patent Application Ser. No. 62/000,151 entitled "LOW PROFILE CAMERA HOUSINGS HAVING CONCAVELY CURVED BASE SURFACES AND RELATED SYSTEMS AND METHODS", filed May 19, 2014, all of which application is incorporated herein by reference in its entirety.

BACKGROUND

There is a demand for cameras suitable for taking first-person videos and still images, such as videos shot by soldiers during operations and athletes during competition or during extreme activity such as BASE jumping. Prior approaches include, for example, cameras or camera housings offered by companies such as GoPro, where cameras/camera housings are attached to stand-off mounts that are in turn attached to hand-held poles, helmets, etc., by a variety of unwieldy devices and contraptions including suction cups, bolt-on hardware and the like. Such prior approaches can catch or snag on things such as cords, cables, wire, branches or impact walls, vehicle/aircraft/door entry and exit points and other such objects, and when such large, stand-off elements are used in military and/or first-responder situations, they can be hit by projectiles such as IED fragments or bullets that would otherwise have missed the helmet and therefore the user, and because of their large size and shape they can give away an individual's covert position. These things can turn an otherwise innocuous occurrence into a potentially very dangerous one.

Thus, there has gone unmet a need for improved devices, systems and methods that can provide at least one of improved imaging ability, reduction of camera snagging, ease of mounting directly to a convex surface or helmet, and low profile footprint in the vertical and/or horizontal plane to helmet-mounted or convex surface mounted cameras, and/or simultaneously providing improved protection to first-responder and military personnel likely to be put in harm's way, such as soldiers, law enforcement officers, and firefighters.

The present devices, systems and methods, etc., provide one or more of these and/or other advantages.

SUMMARY

The present systems, devices and methods, etc., provide low profile concavely curved cameras, camera housings and related systems and methods. These devices, etc., improve one or more of user safety, user ability to operate, and user ability to attach or detach the camera. The systems, etc., provide an overall lower profile, snag free camera housing that comprises first-person camera such as for military personnel or first-responders. As used herein, "military/law enforcement-level" means law enforcement officers, firefighters, soldiers, sailors, and the like, i.e., personnel who are likely to encounter heavy blunt force impacts such as vehicle crashes, bats, truncheons, thrown rocks and ballistic impacts such as .22 caliber and 9-millimeter and 0.44 magnum bullets as well as fragmentations from anti-personnel devices such as grenades and improvised explosive devices (IEDs). Thus, a military/law enforcement-level protection system herein typically meets or exceeds the 2010 National Institute of Justice (NIJ) Level IIIA helmet standards for the helmets herein, 2010 NIJ IIIA standards for body armor, and the face protection element and ballistic armor meets or exceeds or MIL-DTL-43511D and/or the 2010 NIJ Level I, Level IIA, or Level II body armor standards, as desired. Helmets suitable for use with the camera housings discussed herein are military-level helmets such as the Combat Vehicle Crewman (CVC) helmet and an Army Combat Helmet (ACH), as well as the Modular Integrated Communications Helmet (MICH), Personnel Armor System for Ground Troops (PASGT), Lightweight Helmet (LWH), Future Assault Shell Technology (FAST) Helmet, Battleskin, Exfil, etc.

In one aspect, the current devices, systems, methods, etc., comprise low profile concavely curved camera housings including cameras therein in some embodiments, and related systems and methods. Such units typically comprise the following: a) a concave base surface structured to match an outer curvature of a convexly curved base substrate— "concave" as used herein means that the curvature of the base bows inwardly toward the center of the camera housing while "convex" means the opposite curvature; b) a single-motion releasable attachment element such as hook-and-loop fabric, magnets, adhesive or snaps that attaches the base surface to the helmet in a single motion by the user without negatively affecting the integrity of the helmet, and in some embodiments without any additional hardware specifically configured for such attachment of the housing to the helmet; c) is smooth such that all upper surfaces (i.e., all surfaces above the convex base surface) of the housing are without projections or elements that pose a snag hazard while the attachment between the convex base surface of the housing and the convexly curved base substrate contains no gaps or protrusions on which a cord, branch, etc., might catch; and/or d) a very simple user interface and user experience (UI/UX) comprising only controls that can be operated by a single hand without visual interaction by the user and while wearing gloves. In certain embodiments, the camera and/or camera housing can have a flat base surface or a convexly-curved base surface instead of a concave base surface.

One example of the advantages provided by the systems, etc., herein is that the systems reduce hazards to soldiers, sailors, airmen, etc., during parachute operations by reducing snag hazards both inside and when exiting the aircraft, and because the smooth, or aerodynamic, design features enhance performance for the user, such as when falling through the air. A small diameter cord, i.e., a string or thin rope made of several strands braided, twisted, or woven together, such as a parachute cord or military 550 cord, which typically measures 5/32 inch (4 mm) in diameter, can be dragged horizontally or upwardly from any direction over the camera housing (typically including the camera) and adjoined base substrate and yet the cord substantially, and preferably completely, does not get snagged or hooked on the camera housing or the attachment of the camera housing to the convexly curved base substrate because of the shape and design of the camera housing. In some embodiments, the camera housing is no more in height from the underlying convexly curved base substrate than about 2", 1.5", 1", or 0.5", or no more than about 50 cm, 35 cm, 25 cm, or 10 cm.

For first responders and military personnel who are operating in hazardous and extreme environments this vertical footprint of the camera unit and elimination of snag hazards allows these users to be able to operate a helmet-mounted point of view camera without the additional dangers of other cameras. Currently existing cameras, which stand off the helmet in various degrees of awkwardness, often get snagged and are not only a nuisance but also may cause head and neck injuries.

These and other aspects, features and embodiments are set forth within this application, including the following Detailed Description and attached drawings. In addition, various references are set forth herein, including in the Cross-Reference To Related Applications, that discuss certain systems, apparatus, methods and other information; all such references are incorporated herein by reference in their entirety and for all their teachings and disclosures, regardless of where the references may appear in this application.

DETAILED DESCRIPTION

The current devices, systems, methods, etc., comprise low profile concavely curved camera housings and concavely curved or radiused camera units and related systems and methods. In some embodiments, the systems comprise: a low profile, concavely curved camera housing wherein a) all upper surfaces (i.e., all surfaces above the convex base surface) of the camera housing are low profile and smooth such that no upper surfaces of the housing pose a snag hazard; and b) the camera housing comprises a concave base surface contoured to match and attach directly to a convexly curved base substrate such that the connection between the camera housing and the convexly curved base substrate creates no gaps that pose a snag hazard. The devices, etc., can also comprise, c) a single-motion releasable attachment element such as hook-and-loop fabric, adhesive, magnets or snaps that attaches the base surface to the helmet in a single motion by the user without negatively affecting the integrity of the helmet, and in some embodiments without any additional hardware specifically configured for such attachment of the housing to the helmet; and/or d) a very simple user interface and user experience (UI/UX) comprising only controls that can be operated by a single hand without visual interaction by the user, typically while wearing gloves. In other embodiments, the camera housing can be attached to the helmet or other base surface using bolts, intermediate mounts, or other piercing attachment elements that penetrate into or through the base substrate.

Figure 1:
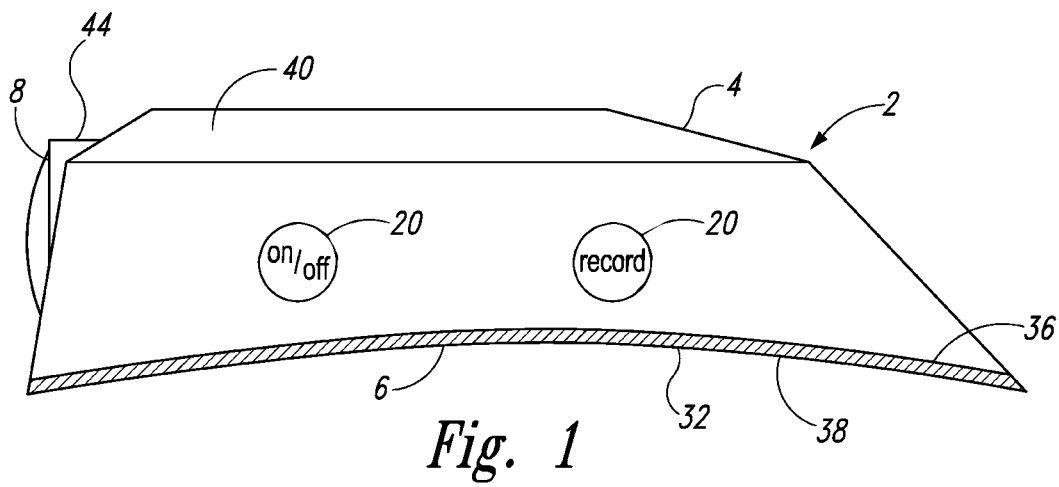
FIG. 1 depicts a side elevational view of a low profile concavely curved camera unit as discussed herein.
Figure 2:
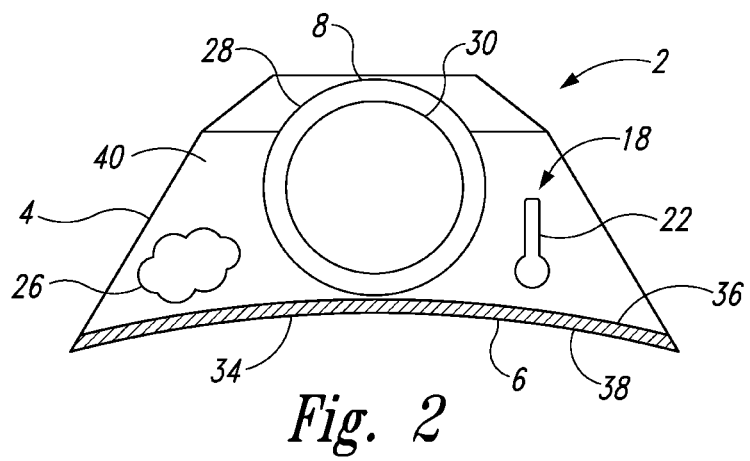
FIG. 2 depicts a front view of a low profile concavely curved camera unit as discussed herein.
Figure 3:
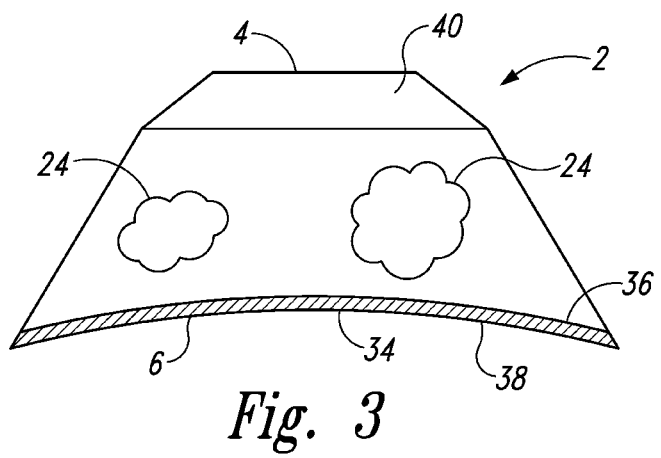
FIG. 3 depicts a rear view of a low profile concavely curved camera unit as discussed herein.

Turning to the figures, FIGS. 1-3 depict side, front and rear views of a low profile concavely curved camera unit 2 as discussed herein. The unit 2 can comprise a camera housing 4 comprising a concave base surface 6 structured to match a curvature of an upper surface of a convexly curved base substrate such as a military-level helmet (reference number 46 in FIGS. 4-6). Unit 2 also can comprise a single-motion releasable attachment/detachment element 36 structured to releasably attach and detach the concave base surface 6 to and from an upper surface of the military helmet and a smooth, non-snag upper surface 14 of the camera housing 12, and a user interface 16 comprising user interface controls 18 that can be operated by a single hand of a user without visual interaction by the user, even by using only a single hand, which hand can be in a glove such as a glove structured for combat.

FIGS. 1-3 also depict a camera 8 covered by a hood 44 that covers the camera 8 and/or camera lens 30, and provide some exemplary, non-limiting possible dimensions for the low profile concavely curved camera unit 2. The camera 8 can be unitary with other elements of low profile concavely curved camera unit 2, as shown in FIGS. 1-3, or can be discrete as shown in certain other figures.

In FIG. 1, the user interface 16 comprising user interface controls 18 can be located on the left side of the low profile concavely curved camera unit 2, wherein the power on/power off and record functions can be controlled by depressable buttons 20. In FIG. 2, the user interface 16 comprises a single user interface control 18 located on the front of the low profile concavely curved camera unit 2 and wherein all desired functions, for example at least the power on/power off and record images functions, are controlled by a single toggle switch 22. In such an embodiment, the power on/power off and "shoot" can be simultaneously engaged upon activating the control switch 18. In FIG. 3, the user interface 16 comprises knobs 24 located on the rear of the low profile concavely curved camera unit 2.

FIG. 2 also shows an optics control knob 26 that controls a camera housing optical element 28 disposed in front of the camera lens 30. In FIG. 2, the camera housing optical element 28 is structured to be non-distorting such that an image transmitted through the camera housing optical element 28 is substantially undistorted upon reaching camera lens 30 of the camera 8. In this embodiment, the camera housing optical element 28 is also structured to enlarge images passing through the camera housing optical element 28 such that an image transmitted through the camera housing optical element 28 is substantially enlarged a pre-determined amount upon reaching the camera lens 30 or to reduce images passing through the camera housing optical element 28 such that an image transmitted through the camera housing optical element 28 is substantially reduced a pre-determined amount upon reaching the camera lens 30. Optics control knob 26 can be a selector switch structured to select between an enlarged image or a reduced image, and/or other imaging modes as desired.

As can be seen by comparing the different views of FIGS. 1-3, the concave base surface 6 can comprise at least two different radii 32, 34. The concave base surface 6 can be rigid or slightly elastic to moldably conform to varying radiuses encountered on different locations on an upper surface of the helmet as in FIGS. 4-5, discussed later. Also as in FIGS. 1-3, the attachment/detachment element 36 can be a hook-and-loop fabric 38 and the low profile concavely curved camera unit 2 does not include any device that penetrates the helmet, including that low profile concavely curved camera unit 2 does not include any bolts, screws or other attachment devices that compromise the integrity of the underlying helmet.

The low profile concavely curved camera unit 2 can be made of a personnel-protection material 40.

Figure 4:
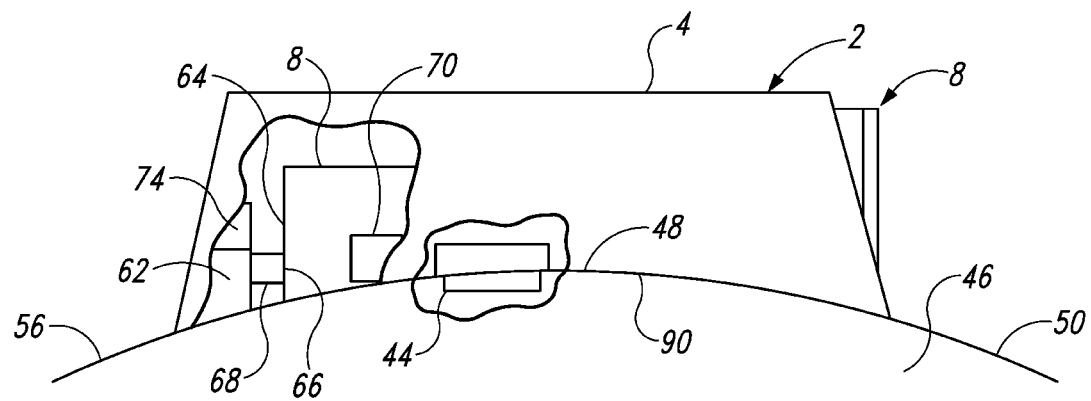
FIG. 4 depicts a side view of a low profile concavely curved camera unit as discussed herein attached to a military-level helmet.
Figure 5:
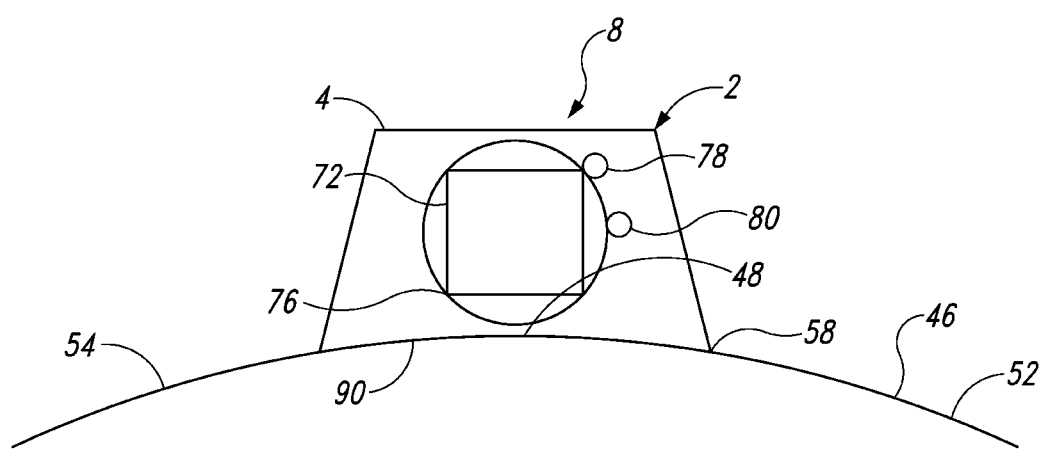
FIG. 5 depicts a front view of a low profile concavely curved camera unit as discussed herein attached to a military-level helmet.

Turning to FIGS. 4-5, such figures depict side and front views of a system comprising a military-level helmet 46 and a low profile concavely curved camera unit 2 as discussed herein. The helmet 46 and the unit 2 can be structured to interact cooperatively such that the low profile concavely curved camera unit 2 can be easily and repeatedly attached and detached to different parts of the helmet 46, i.e., to differently curved convex base substrates 90 of the helmet 90. For example, the low profile concavely curved camera unit 2 can be easily and repeatedly attached and detached to each of a top 48, front 50, left side 52, right side 54 and back 56 of the helmet 46.

In FIG. 4, the attachment/detachment element 36 is a pair of powerful magnets 44, shown in cutaway. The magnets 44 can be configured to hold to each other without physically penetrating the base substrate 90. In situations where the base substrate 90 comprises metallic or other magnet-responsive materials, only a single magnet need be used. In FIG. 5, the attachment/detachment element 36 is an adhesive 58. The concave base surface 6 is slightly elastic to moldably conform to varying radiuses encountered on different locations on the upper surface 60 of the helmet 46. In these figures, the helmet is an OPS core fast helmet.

As shown in FIG. 4, the low profile concavely curved camera unit 2 comprises a first plug-in docking element 62 shown in cutaway and configured to dock with a corresponding, second plug-in docking element 64 on camera 8, which camera 8 is discrete from low profile concavely curved camera unit 2 and is also configured to dock with unit 2. The first plug-in docking element 62 and the second plug-in docking element 64 can comprise corresponding male and female members, 66, 68. Exemplary docking elements can be USB or HDMI connections or a hard connection to additional components inside the helmet that do not fit inside the housing, or other items that may desirably docked the camera 8 and/or camera housing 4. The unit 2 also comprises at least one wireless transmitter element 70 structured to send real-time images to remote monitors. The wireless transmitter element 70 can be a Wi-Fi transmitter, Bluetooth® transmitter or any suitable other wireless transmitter, particularly sturdy and secure transmitters suitable for combat situations.

The camera housing 4 further can comprise at least one camera housing power source 74 structured to provide power to the camera 8. The camera housing power source 74 can be, for example, a battery such as a lithium battery or any other battery suitable for intense situations such as combat or fighting fires. The camera housing power source 74 can be connected to the camera 8 via a plug-in docking element, which can be the same or a different docking element used to connect the camera housing 4 and its associated elements and devices to the camera 8. Thus, the power docking element can also be first plug-in docking element 62 and second plug-in docking element 64 so long as proper wiring and structure is provided. The camera housing power source can also be a wireless recharger if desired.

As shown in FIG. 5, the camera housing 4 further can comprise at least one camera housing light-enhancement element 72. The camera housing light-enhancement element 72 can comprise at least one filter 76 structured to selectively block or reduce selected wavelengths of light. For example, filter 76 can selectively block at least one of infrared (IR) light, near-infrared (NIR) light, visible light and ultraviolet (UV) light.

The camera housing light-enhancement element 72 can also comprise one or more of a night-vision device 78 or a one camera housing light emitter 80. The camera housing light emitter 80 can be structured to provide any desired light, for example to variably, selectively emit infrared (IR) light, near-infrared (NIR) light, visible light and ultraviolet (UV) light.

Figure 6:
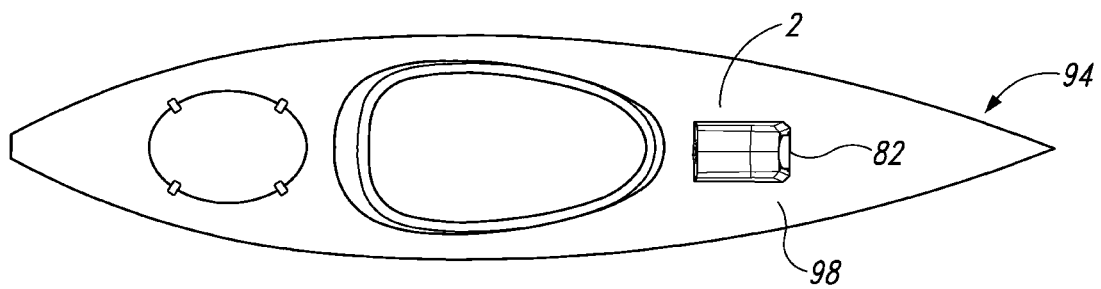
FIG. 6 depicts a side plan view of a low profile concavely curved camera unit as discussed herein attached to a kayak.
Figure 7:
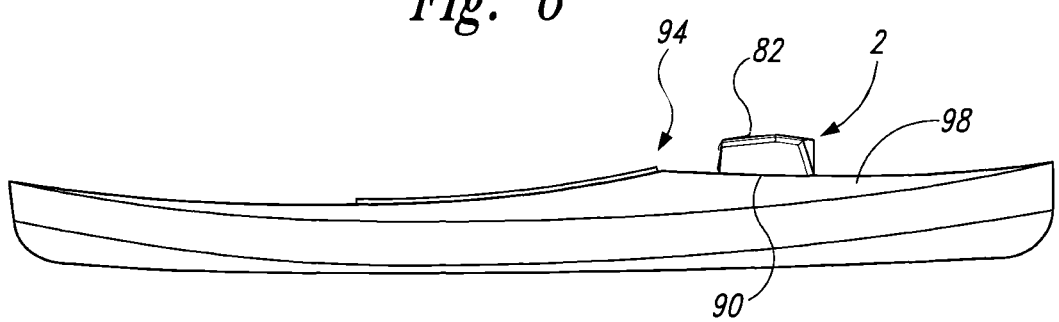
FIG. 7 depicts a top plan view of a low profile concavely curved camera unit as discussed herein attached to a kayak.

FIGS. 6 and 7 depict exemplary side and top plan views of a mock-up 82 of a low profile concavely curved camera unit 2 as discussed herein attached to the bow 98 of a kayak 94.

Figure 8:
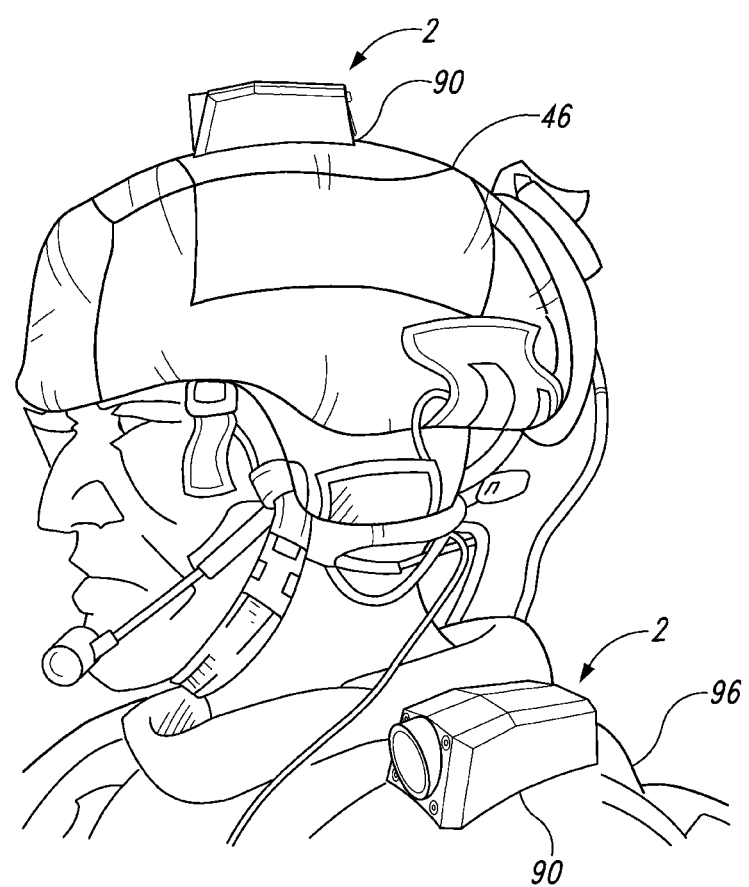
FIG. 8 depicts a side view of low profile concavely curved camera units as discussed herein attached to a helmet and to a shoulder pad of a soldier.

FIG. 8 depicts a side view of low profile concavely curved camera units 2 as discussed herein attached to a helmet 46 and to a shoulder pad 96 of a soldier. The convex base substrate 90 can also be any other desirable base substrate, including gear and machines such as aircraft, vehicles, etc.

Figure 9:
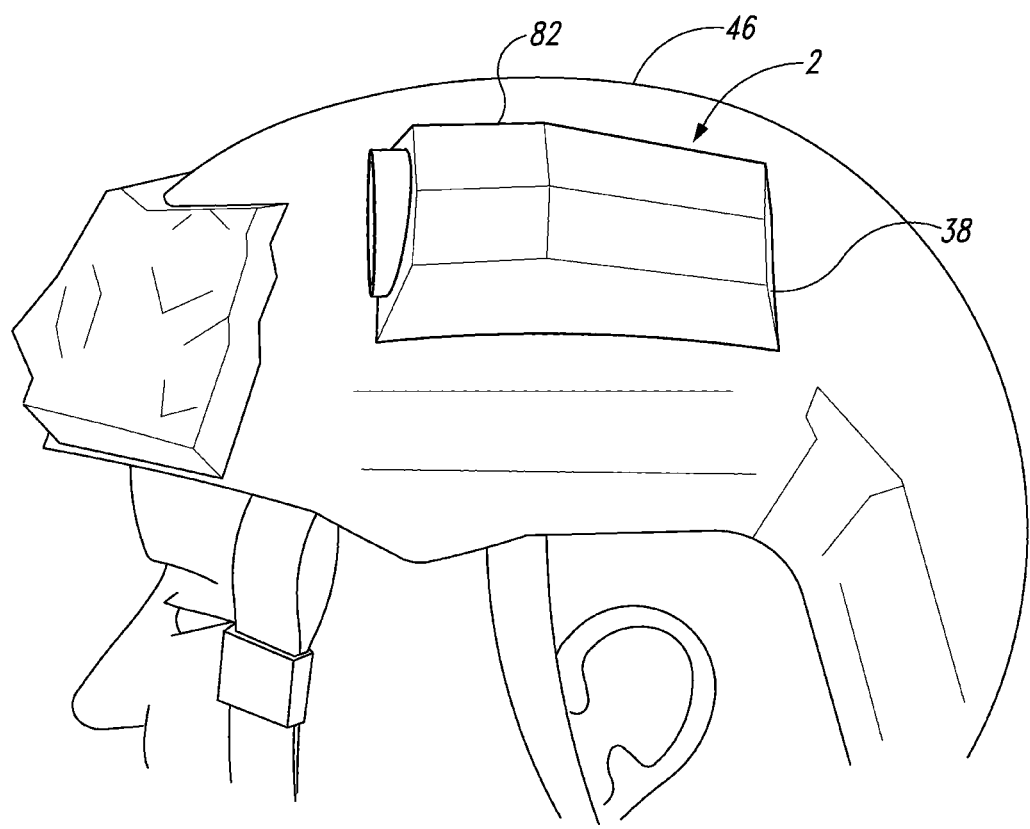
FIG. 9 depicts a side view of a mock-up of a low profile concavely curved camera unit as discussed herein attached to a left side of a military-level helmet.
Figure 10:
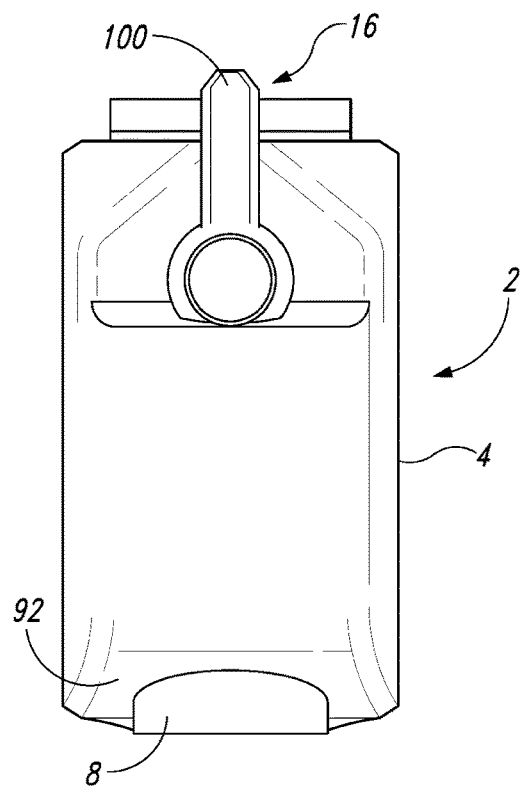
FIG. 10 depicts a top plan view of a further embodiment of a low profile concavely curved camera unit as discussed herein comprising a top-mounted toggle switch at the user interface.
Figure 11:
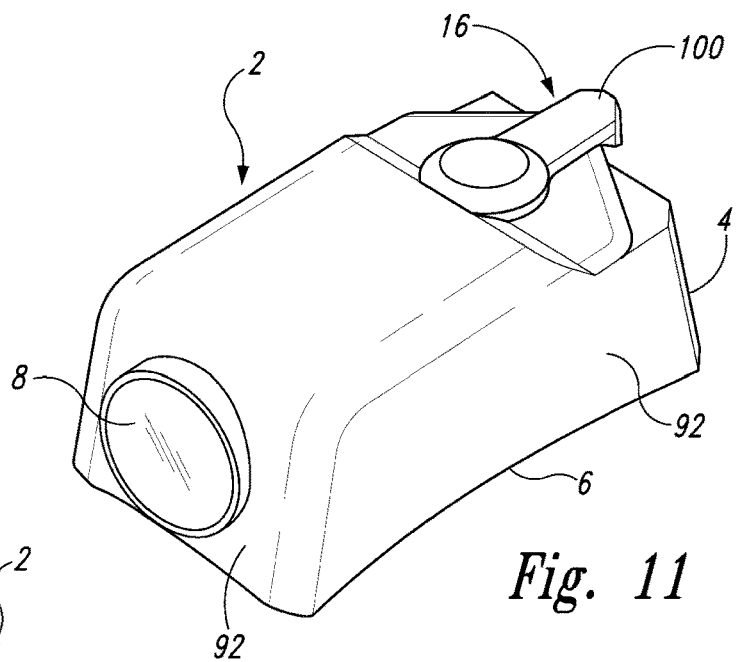
FIG. 11 depicts a perspective view of a further embodiment of a low profile concavely curved camera unit as discussed herein comprising a top-mounted toggle switch at the user interface.
Figure 12:
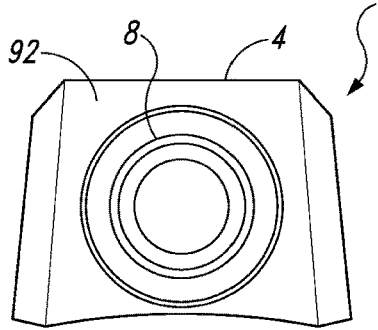
FIG. 12 depicts a side plan view of a further embodiment of a low profile concavely curved camera unit as discussed herein comprising a top-mounted toggle switch at the user interface.
Figure 13:
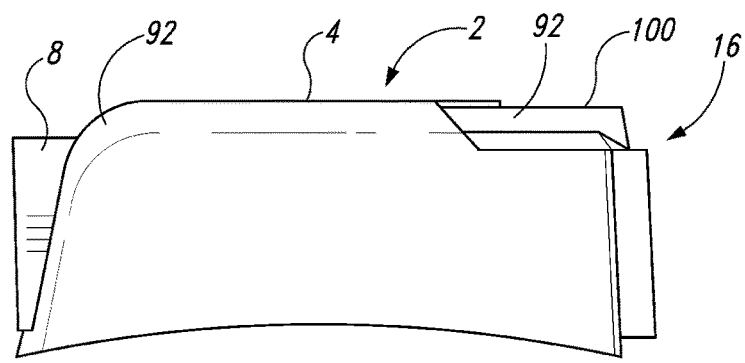
FIG. 13 depicts a front plan view of a further embodiment of a low profile concavely curved camera unit as discussed herein comprising a top-mounted toggle switch at the user interface.

FIG. 9 depicts an exemplary front view of a mock-up 82 of a low profile concavely curved camera unit 2 as discussed herein attached to a left side of a military-level helmet 84. FIGS. 4-9 demonstrate the ability of the camera housings 4 herein to adapt to and fit closely to a variety of different, multi-radiused convex base substrates 90 without snag hazards and typically without significant air gaps between the camera housings 4 and the convex base substrates 90.

FIGS. 10-13 depict views of a further embodiment of a low profile concavely curved camera unit 2 as discussed herein comprising a top-mounted toggle switch 100 at the user interface 16. In FIGS. 10-13, the camera 8 is discrete from the housing elements 92. "Discrete" as used in this context means that the camera 8 is separate from the camera housing 4 and can be inserted, moved and/or removed as desired. In addition, the camera housing 4 and the camera can be manufactured separately then combined either in a further manufacturing step or in the field or otherwise as desired. The embodiment in FIGS. 10 and 11 also depicts the non-snag aspects of the housing, knobs, etc., applying only to the front, sides and top of the camera housing but not to the back of the camera housing.

Figure 14:
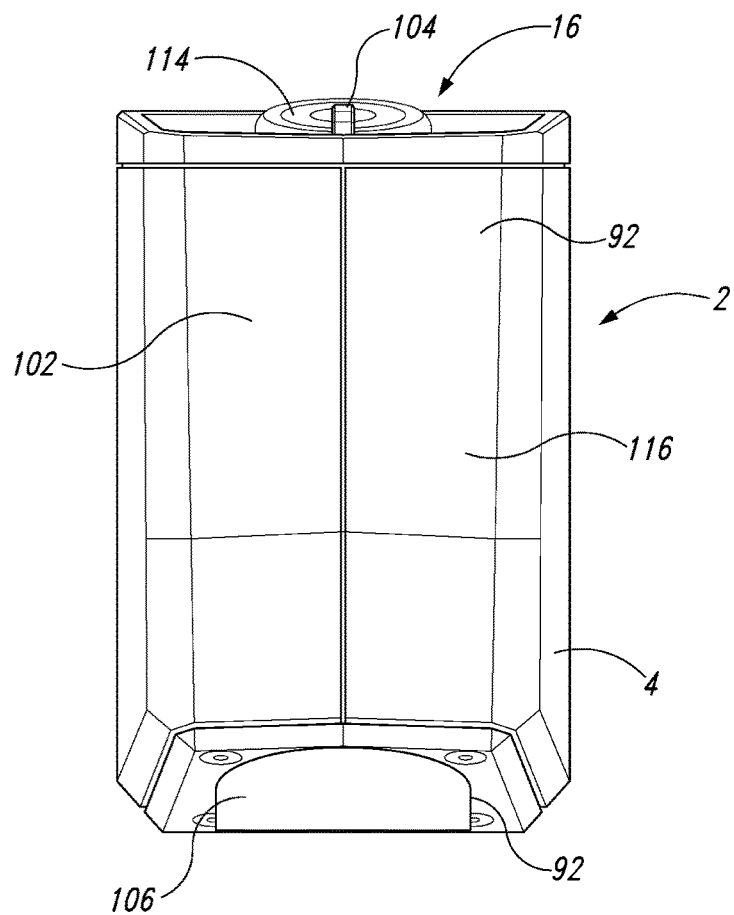
FIG. 14 depicts a top plan view of a further embodiment of a low profile concavely curved camera unit as discussed herein comprising a rear mounted rotary tab at the user interface and a recessed or flush-mounted camera lens at the front.
Figure 15:
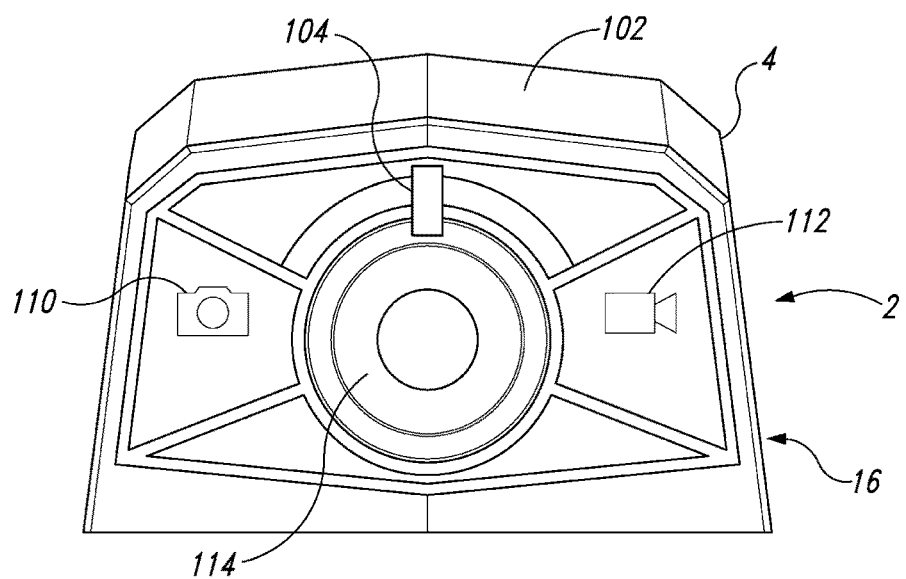
FIG. 15 depicts a rear plan view of a further embodiment of a low profile concavely curved camera unit as discussed herein comprising a rear mounted rotary tab at the user interface.

FIGS. 14-15 depict views of a further embodiment of a low profile concavely curved camera unit 2 as discussed herein comprising a rear mounted rotary tab 104 at the user interface 16 and a recessed or flush-mounted camera lens 106 at the front. In FIGS. 14-15, the camera 8 is unitary with the housing elements 92. "Unitary" as used in this context means that at least the shell of the camera 8 and camera housing 4 are made from a single or combined piece(s) of material such that the camera cannot be separately inserted into or removed from the housing. Advantageously, the camera housing 4 and the camera 8 contained within it can be manufactured in a single process.

In FIGS. 14-15, the unit 2 also comprises a recessed panel 102 that permits or assists access to the camera and other inner workings/elements inside the camera housing 4. Recessed panel 102 can be either fixed or depressible. The recess can enhance the ability of users to hold on to the camera housing 4, for example when the camera housing 4 is in-place on a base substrate or when the camera housing 4 is detached from the base substrate. The recessed panel can either be depressed to open up and allow access to inner workings inside the housing, and/or can provide a hold-point so that a user can more easily grasp the camera housing 4 while accessing inner workings through a different access point such as an access door 116.

Also, user interface 16 comprising the rear mounted rotary tab 104 comprises icons for both still photography 110 and video photography 112. In one embodiment, the upright position for rotary tab 104 is the "off" position while moving to either icon both turns on the camera 8 and causes the indicated function to begin working. The on/off of recording/image taking can in turn be controlled remotely or by depressing button 114, or can be automatic upon activation of the rotary tab 104 such that "record images" (whether still images, a series of still images or video) is controlled by a single switch, button or other recording activation element. In one embodiment, as shown in FIG. 15, the user interface comprises at least one depressable button 114 and the user interface is configured such that the camera can be set for a standby mode such that depressing the button during the standby mode causes the camera to begin recording images.

Figure 16:
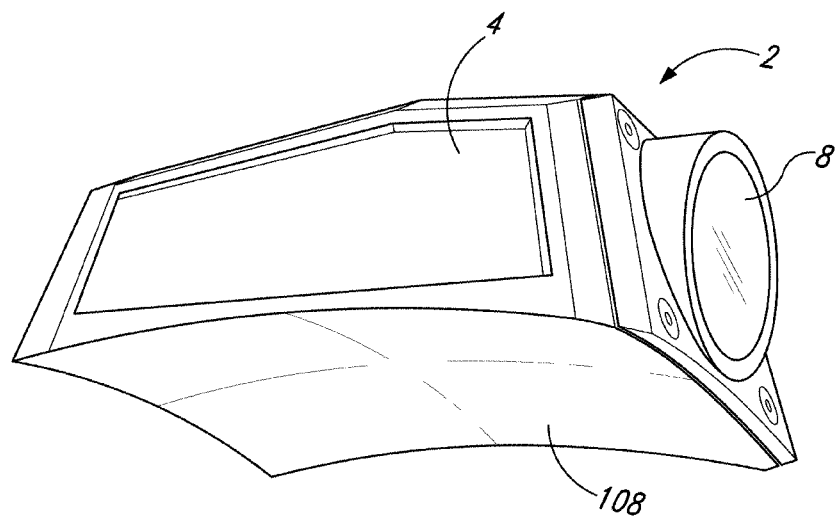
FIG. 16 depicts an underneath perspective view of a low profile concavely curved camera unit as discussed herein showing a multiply-radiused base surface.

FIG. 16 depicts an underneath perspective view of a low profile concavely curved camera unit 2 as discussed herein showing a multiply-radiused base surface 108.

Figure 17:
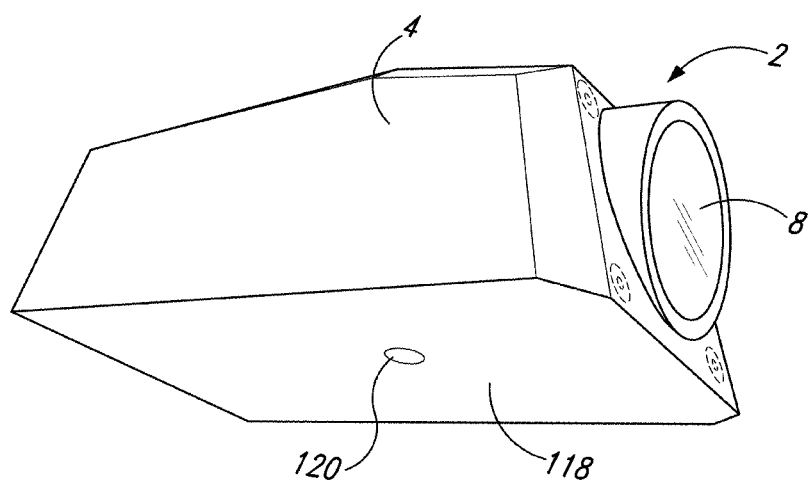
FIG. 17 depicts an underneath perspective view of a low profile concavely curved camera unit as discussed herein showing a flat base surface.

FIG. 17 depicts an underneath perspective view of a low profile camera unit 2 as discussed herein except that the unit has a flat base surface 118. The camera housing 4 shown in FIG. 17 also includes a threaded hole 120 to receive a bolt or other penetrating attachment element that extends from or through the base substrate (base substrate not shown); the male and female features of such connectors can be reversed if desired, and this feature can likewise be used with concavely curved base surfaces.

Turning to a more general discussion of certain aspects, features and embodiments herein, the low profile concavely curved camera unit 2 and the helmet are structured to interact cooperatively such that the low profile concavely curved camera unit 2 can be easily and repeatedly attached and detached to different parts of the helmet, for example the top, front, left side, right side or back of the helmet. Thus, some embodiments herein comprise low profile concavely curved camera unit 2—helmet systems comprising a) a low profile concavely curved camera unit 2 and b) a helmet comprising attachment elements, usually on the upper surface of the helmet, structured to hold the low profile concavely curved camera unit 2 to the helmet.

The shape of the base surface of the low profile concavely curved camera unit is structured to fully contact the curved mounting surface of the helmet by having a radiused curvature, which curvature can have one, two or more radii if desired. This creates superior retention and stability to the helmet surface by increasing amount of camera housing base surface area contacting the curved mounting surface of the helmet. The base surface can be rigid or can be slightly elastic to moldably conform to the varying radiuses encountered on different locations on the upper surface of the helmet.

The low profile concavely curved camera unit is structured to attach its base surface to the helmet in a single motion by the user without any additional hardware and without negatively affecting the integrity of the helmet. Suitable attachment/detachment elements for such attachment/detachment include hook-and-loop fabric or adhesive where one part of the attachment system, such as the loop-fabric, is pre-attached to the helmet, typically in multiple locations around the helmet while the hook-fabric is preattached to the concave base surface. This can be advantageous because the user can then easily grab the low profile concavely curved camera unit with a single hand and move it from one spot to another on the helmet, for example to reduce the exposed area of the helmet or to improve the view for the low profile concavely curved camera unit. In certain embodiments, the attachment/detachment elements do not include any bolts, screws or other devices that penetrate the helmet.

The upper surfaces of the low profile concavely curved camera unit (i.e., those surfaces above the concave base surface and thus visible when attached to the helmet and exposed to outside elements and dangers) are structured to provide a smooth, non-snag structure that contains no gaps or protrusions on which a cord, branch, etc., might catch; the low profile concavely curved camera unit is aerodynamically shaped and low profile in such a way that obstacles will deflect off or up and over as they pass by the unit.

The low profile concavely curved camera unit can comprise one or more wireless transmitter elements such as Wi-Fi or Bluetooth® transmitters. Such transmitters can, for example, send real-time images to remote monitors or decision makers, or provide remote control of the camera to persons either near or far from the wearer. Such monitors can also be part of a plug-in docking element in the low profile concavely curved camera unit, typically comprising corresponding male and female members.

The low profile concavely curved camera unit can be made of any suitable material such as plastic or carbon fiber. In some embodiments, the camera housing is structured to improve the personnel-protection ability of the helmet and thus is made of a military-level personnel-protection material such as an anti-ballistic material element, such as a bullet-proof material, to inhibit the penetration of ballistic and fragmentation projectiles at various force levels to repel different ballistic hazards.

The camera housing of the low profile concavely curved camera unit can further comprise one or more camera housing optical elements disposed in front of the camera lens that are structured to be one or more of, a) non-distorting such that an image transmitted through the camera housing optical element is substantially undistorted upon reaching the camera lens; b) enlarging such that such that an image transmitted through the camera housing optical element is substantially enlarged a pre-determined amount upon reaching the camera lens; and/or c) reducing such that an image transmitted through the camera housing optical element is substantially reduced upon reaching the camera lens (in some aspects, such image-reducing camera housing optical elements can be considered "fish-eye" lenses or the like). Generally, the enlarging and/or reducing optical elements are also substantially non-distortive other than the enlarging and/or reducing to provide the best possible image to the camera imaging sensor. In still further embodiments, the camera housing comprises at least two of the three camera housing optical elements above, and further typically all three, along with an image selector switch such as a dial or toggle that selects between the different optical choices.

In another embodiment, the camera housing of the low profile concavely curved camera unit comprises an opening in front of the camera within the unit so that the view of the camera is not impeded or otherwise affected by the camera housing. If desired, the opening at the front of the housing can be open air or something else such as a window or lens.

The camera housing can also comprise one or more camera housing light-enhancement elements. Such camera housing light-enhancement elements can be, for example, filters that enhance the ability of the camera to detect certain wavelengths or bands of light by blocking or reducing selected wavelengths of light, including for example infrared (IR) light, near-infrared (NIR) light, visible light and ultraviolet (UV) light, or other desired electromagnetic wavelengths. Suitable filters can include, for example, bandpass filters, notch filters, fluorescent light-detection filters, etc. Similarly, the camera housing light-enhancement elements can either or also comprise one or more light-enhancement elements to enhance the ability of the camera to detect certain wavelengths or bands of light by increasing selected wavelengths or bands of light such as night-vision devices.

The camera housing can also comprise one or more camera housing light emitters, including if desired light emitters structured to variably, selectively emit certain desired wavelengths of light, including for example infrared (IR) light, near-infrared (NIR) light, visible light and ultraviolet (UV) light, or other desired electromagnetic wavelengths.

The camera housing can also comprise one or more camera housing power sources such as a battery pack that is additional to any battery pack or other internal power source carried within the camera. In such embodiments, as well as for certain other embodiments herein, the camera portion of the low profile concavely curved camera unit can comprise one or more docking elements structured to "plug-in" and "unplug" the camera to the camera housing power source, or to other structures and functions contained in the camera housing.

The camera in the low profile concavely curved camera unit can be unitary with the camera housing or can be discrete and separable. Unitary units can be advantageous, for example, for simplicity while discrete units can be advantageous, for example, for ease of repairing defective or damaged elements. Suitable cameras include any suitable imaging device such as those comprising a charge coupled sensor (CCD), a charge injection sensor (CID), or complementary metal-oxide semi-conductor sensor (CMOS). The cameras can be video, still-photo or both, for example a camera with both a video mode and a still-photo mode. The camera can also include other desirable modes, such as time-lapse, burst photo (multiple rapidly-shot still photos), etc.

The low profile concavely curved camera unit can also comprise surface grips on one or more visible surfaces of the unit to enhance the ability of a user, particularly a user with a gloved hand, to easily attach/detach the low profile concavely curved camera unit to/from a helmet. In some embodiments, the surface grips comprise high-grip material attached to the visible surfaces without any protrusions extending significantly (i.e., extending far enough to pose a snag hazard) from the visible surfaces.

The low profile concavely curved camera unit comprises a very simple user interface and user experience (UI/UX) comprising only controls that can be operated by a single hand without visual interaction by the user and while wearing gloves. In some embodiments, the user interface comprises a single control switch that controls essential operations of the camera such as power on/power off and "record", e.g., (i.e., "shoot" in video camera mode or "shoot" in photo mode). The power on/power off and "shoot" can be simultaneously engaged if desired, e.g., turning on the power automatically causes the video camera to start recording and turning off the power automatically causes the video camera to stop recording.

The control switch can be, for example a depressible button, a toggle switch, a knob, or any other easily manipulated control device, and the control switch can be placed so that it is easily located by a user and can be selectively operated by tactile feedback.

In other aspects, the low profile concavely curved camera unit can be contoured to attach to other, non-helmet support structures, such as vests, shoulders, apparatus, etc. The low profile concavely curved camera unit can also be contoured for non-military/non-first responder activities, such as for vehicular racing helmets, sports helmets, etc.

The present application is further directed to methods of making the various elements of the systems and apparatus herein, including making the systems and apparatus themselves from such elements, as well as to methods of using the same, including for example a user selectively attaching and detaching the low profile concavely curved camera unit from a helmet, operating the control switch or otherwise use or manipulate the devices and elements described herein. Each of these things can advantageously be done while the helmet is on the user's head, i.e., while the helmet and the device are not visible to the user.

All terms used herein are used in accordance with their ordinary meanings unless the context or definition clearly indicates otherwise. Also unless expressly indicated otherwise, in the specification the use of "or" includes "and" and vice-versa. Non-limiting terms are not to be construed as limiting unless expressly stated, or the context clearly indicates, otherwise (for example, "including," "having," and "comprising" typically indicate "including without limitation"). Singular forms, including in the claims, such as "a," "an," and "the" include the plural reference unless expressly stated, or the context clearly indicates, otherwise.

The scope of the present devices, systems and methods, etc., includes both means plus function and step plus function concepts. However, the claims are not to be interpreted as indicating a "means plus function" relationship unless the word "means" is specifically recited in a claim, and are to be interpreted as indicating a "means plus function" relationship where the word "means" is specifically recited in a claim. Similarly, the claims are not to be interpreted as indicating a "step plus function" relationship unless the word "step" is specifically recited in a claim, and are to be interpreted as indicating a "step plus function" relationship where the word "step" is specifically recited in a claim.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims or other claim having adequate support in the discussion and figures herein.

What is claimed is:

1. A low profile, concavely curved camera housing wherein the low profile, concavely curved camera housing consists of a single housing and wherein all upper surfaces of the camera housing are low profile and smooth such that no upper surfaces of the housing pose a snag hazard and wherein the camera housing comprises a concave base surface contoured to match and attach directly to a convexly curved base substrate such that the connection between the camera housing and the convexly curved base substrate has no gaps that pose a snag hazard, wherein the concave base surface comprises a complex curvature comprising multiple different radii of a curvature in different directions such that the curvature of the base bows inwardly toward the center of the camera housing, and wherein the upper surfaces of the camera housing comprise all surfaces of the housing above the convex base surface.

2. The concavely curved camera housing of claim 1 wherein the housing further comprises a single-motion releasable attachment/detachment element structured to releasably attach and detach the concave base surface to and from the convexly curved base substrate in a single motion by a user.

3. The concavely curved camera housing of claim 1 wherein the single-motion releasable attachment/detachment element is structured to be released using only a single hand of the user.

4. The concavely curved camera housing of claim 1 wherein the concave base surface is rigid.

5. The concavely curved camera housing of claim 1 wherein the base surface of the housing comprises an elastic layer configured to moldably conform to varied curvatures of a complexly curved convexly curved base substrate.

6. The concavely curved camera housing of claim 1 wherein the elastic layer comprises an attachment/detachment element configured to releasably attach the concave base surface to the convexly curved base substrate.

7. The concavely curved camera housing of claim 6 wherein the elastic layer is an attachment/detachment element consisting essentially of a first layer of a hook-and-loop fabric, the first layer of the hook-and-loop fabric configured to attach to a corresponding second layer of the hook-and-loop fabric attached to the convexly curved base substrate.

8. The concavely curved camera housing of claim 7 wherein the elastic layer is an adhesive layer configured to releasably attach to the convexly curved base substrate.

9. The concavely curved camera housing of claim 1 wherein the concave base surface of the camera housing conforms to the convexly curved base substrate such that there are no air gaps between the concave base surface of the camera housing and the convexly curved base substrate.

10. The concavely curved camera housing of claim 1 wherein the camera housing further contains d) a user interface comprising only controls configured such that all can be operated by a single hand of a user without visual interaction by the user with the user interface.

11. The concavely curved camera housing of claim 10 wherein the hand is a gloved hand.

12. The concavely curved camera housing of claim 10 wherein the user interface is configured to switch between still photo mode and video record mode.

13. The concavely curved camera housing of claim 1 wherein the camera housing contains a camera.

14. The concavely curved camera housing of claim 13 wherein the camera is unitary with housing elements of the low profile concavely curved camera housing.

15. The concavely curved camera housing of claim 13 wherein the camera is discrete from housing elements of the low profile concavely curved camera housing.

16. The concavely curved camera housing of claim 15 wherein the camera housing comprises a first plug-in docking element configured to dock with the camera and the camera comprises a corresponding, second plug-in docking element configured to dock with camera housing.

17. The concavely curved camera housing of claim 16 wherein the first plug-in docking element and the second plug-in docking element are corresponding male and female members.

18. The concavely curved camera housing of claim 10 wherein the user interface comprises only controls that can be operated by a single hand of a user without visual interaction by the user with the user interface.

19. The concavely curved camera housing of claim 10 wherein all controls of the user interface can be operated by a single gloved hand.

20. The concavely curved camera housing of claim 19 wherein the user interface comprises a single control switch structured to control at least the following operations of the camera: a) power on/power off; and b) a record images function.

21. The concavely curved camera housing of claim 20 wherein the power on/power off and the record images functions are simultaneously engaged upon activating the control switch.

22. The concavely curved camera housing of claim 20 the user interface comprises at least one recording activation element and the user interface is configured such that the camera can be set for a standby mode such that activating the recording activation element during the standby mode causes the camera to begin recording images.

23. The concavely curved camera housing of claim 19 wherein the control switch is a depressible button, a toggle switch, or a knob.

24. The concavely curved camera housing of claim 1 wherein the concave base surface of the camera housing comprises at least two different radii.

25. The concavely curved camera housing of claim 1 wherein the low profile concavely curved camera housing does not include any device that penetrates the convexly curved base substrate.

26. The concavely curved camera housing of claim 1 wherein the camera housing comprises at least one wireless transmitter element structured to send real-time images to remote monitors.

27. The concavely curved camera housing of claim 26 wherein the wireless transmitter element is a Wi-Fi transmitter.

28. The concavely curved camera housing of claim 1 wherein the camera housing comprises a personnel-protection material.

29. The concavely curved camera housing of claim 1 wherein the camera housing of the low profile concavely curved camera housing further comprises at least one camera housing optical element disposed in front of the camera lens.

30. The concavely curved camera housing of claim 29 wherein the camera housing optical element disposed in front of the camera lens is structured to be non-distorting such that an image transmitted through the camera housing optical element is substantially undistorted upon reaching a camera lens of the camera.

31. The concavely curved camera housing of claim 29 wherein the camera housing optical element disposed in front of the camera lens is structured to enlarge images passing through the camera housing optical element such that an image transmitted through the camera housing optical element is substantially enlarged a pre-determined amount upon reaching the camera lens.

32. The concavely curved camera housing of claim 29 wherein the camera housing optical element disposed in front of the camera lens is structured to reduce image size of images passing through the camera housing optical element such that an image transmitted through the camera housing optical element is substantially reduced a pre-determined amount upon reaching the camera lens.

33. The concavely curved camera housing of claim 29 wherein the camera housing further comprises an image selector switch structured to select between an enlarged image or a reduced image.

34. The concavely curved camera housing of claim 1 wherein the camera housing further comprises at least one camera housing light-enhancement element.

35. The concavely curved camera housing of claim 34 wherein the camera housing light-enhancement element comprises at least one filter structured to selectively block or reduce selected wavelengths of light.

36. The concavely curved camera housing of claim 35 wherein the filter selectively blocks at least one of infrared (IR) light, near-infrared (NIR) light, visible light and ultraviolet (UV) light.

37. The concavely curved camera housing of claim 35 wherein the camera housing light-enhancement element comprises a night-vision device.

38. The concavely curved camera housing of claim 1 wherein the camera housing further comprises at least one camera housing light emitter.

39. The concavely curved camera housing of claim 38 wherein the camera housing light emitter is structured to variably, selectively emit infrared (IR) light, near-infrared (NIR) light, visible light and ultraviolet (UV) light.

40. The concavely curved camera housing of claim 1 wherein the camera housing further comprises at least one camera housing power source structured to provide power to the camera.

41. The concavely curved camera housing of claim 40 wherein the camera housing is structured to provide power from the camera housing power source to the camera via a plug-in docking element.

42. The concavely curved camera housing of claim 41 wherein the plug-in docking element comprises a first plug-in docking element and a second plug-in docking element which are corresponding male and female members.

43. The concavely curved camera housing of claim 1 wherein the camera housing further comprises surface grips on one or more upper visible surfaces of the camera housing.

44. The concavely curved camera housing of claim 43 wherein the surface grips comprise high-grip material attached to the upper visible surfaces without any protrusions extending significantly from the visible surfaces.

45. The concavely curved camera housing of claim 1 wherein the camera housing further comprises surface grips on one or more visible surfaces of the camera housing.

46. The concavely curved camera housing of claim 1 wherein the convexly curved base substrate is an outer surface of a helmet.

47. The concavely curved camera housing of claim 1 wherein the helmet is a military-level helmet.

48. The concavely curved camera housing of claim 47 wherein the military-level helmet is a Combat Vehicle Crewman (CVC) helmet, an Army Combat Helmet (ACH), a Modular Integrated Communications Helmet (MICH) helmet or a Future Assault Shell Technology (FAST) Helmet.

49. The concavely curved camera housing of claim 1 wherein the convexly curved base substrate is a surfboard.

50. The concavely curved camera housing of claim 1 wherein the convexly curved base substrate is a kayak.

51. The concavely curved camera housing of claim 1 wherein the camera housing cannot snag a cord measuring about 5/32" in diameter.

52. A system comprising the low profile concavely curved camera housing according to claim 1 and a convexly curved base substrate.

53. The system of claim 52 wherein and the low profile concavely curved camera housing and the convexly curved base substrate are attached to each other.

54. The system of claim 52 wherein the convexly curved base substrate and the low profile concavely curved camera housing are structured to interact cooperatively such that the concavely curved camera housing can be repeatedly attached and detached to different parts of the convexly curved base substrate.

55. The system of any one of claim 52 wherein the convexly curved base substrate comprises at least one attachment element configured such that the concavely curved camera housing can be repeatedly attached and detached to the convexly curved base substrate.

56. The system of claim 55 wherein the convexly curved base substrate comprises a plurality of base substrate attachment elements located at a plurality of distinct locations on the convexly curved base substrate, each of the locations configured to hold the concavely curved camera housing upon attachment.

57. The system of claim 56 wherein the plurality of base substrate attachment elements are located at least at a top, front, left side, right side and back of the convexly curved base substrate.

58. The system of claim 56 wherein the convexly curved base substrate is a military-level helmet.

59. The system of claim 56 wherein the convexly curved base substrate is a kayak.

60. The system of claim 56 wherein the convexly curved base substrate is a shoulder pad.

61. A method comprising manufacturing a concavely curved camera housing according to claim 1.

62. A method comprising manufacturing a system according to claim 52.

63. A method comprising using a concavely curved camera housing according to claim 1.

64. A method comprising using a system according to claim 52.

65. A low profile, camera housing wherein the low profile, concavely curved camera housing consists of a single housing and wherein all upper surfaces of the camera housing are low profile and smooth such that no upper surfaces of the housing pose a snag hazard and wherein the camera housing comprises a flat surface contoured such that the connection between the camera housing and a flat base substrate has no gaps that pose a snag hazard, wherein the concave base surface comprises a complex curvature comprising multiple different radii of curvature in different directions such that the curvature of the base bows inwardly toward the center of the camera housing, and wherein the upper surfaces of the camera housing comprise all surfaces of the housing above the convex base surface.

66. The camera housing of claim 65 wherein the housing further comprises a single-motion releasable attachment/detachment element structured to releasably attach and detach the flat base surface to and from the flat curved base substrate in a single motion by a user.

67. The camera housing of claim 66 wherein the single-motion releasable attachment/detachment element is structured to be released using only a single hand of the user.

68. The camera housing of any one of claim 65 wherein the base surface of the housing comprises an elastic layer configured to moldably conform to varied curvatures of a complexly curved base substrate.

69. The camera housing of any one of claim 68 wherein the elastic layer comprises an attachment/detachment element configured to releasably attach the flat base surface to the flat curved base substrate.

70. The camera housing of claim 65 wherein the flat base surface of the camera housing is configured to conform to the flat base substrate such that there are no air gaps between the flat base surface of the camera housing and the flat base substrate.

71. A method comprising manufacturing flat camera housing according to claim 65.

72. A method comprising using a concavely curved camera housing according to claim 65.

* * * * *